(12) United States Patent
Hopp (10) Patent No.: US 11,129,375 B2
(45) Date of Patent: Sep. 28, 2021

(54) MINNOW CAPTURING SYSTEM AND METHOD

(71) Applicant: Michael Hopp, Sioux Falls, SD (US)

(72) Inventor: Michael Hopp, Sioux Falls, SD (US)

(*) Notice: Subject to any disclaimer, the term of this patent is extended or adjusted under 35 U.S.C. 154(b) by 109 days.

(21) Appl. No.: 16/735,783

(22) Filed: Jan. 7, 2020

(65) Prior Publication Data

US 2020/0137998 A1    May 7, 2020

Related U.S. Application Data

(63) Continuation-in-part of application No. 15/920,140, filed on Mar. 13, 2018, now Pat. No. 10,547,764.

(51) Int. Cl.
*A01K 97/00*  (2006.01)
*A01K 97/05*  (2006.01)
*A01K 97/04*  (2006.01)

(52) U.S. Cl.
CPC ............ *A01K 97/05* (2013.01); *A01K 97/045* (2013.01)

(58) Field of Classification Search
CPC ...... A01K 97/00; A01K 97/04; A01K 97/045; A01K 97/05
See application file for complete search history.

(56) References Cited

U.S. PATENT DOCUMENTS

| | | | |
|---|---|---|---|
| 1,041,195 A | 10/1912 | Thomas | |
| 2,055,912 A | 9/1936 | Schonger | |
| 2,465,812 A | 3/1949 | Mohme | |
| 2,502,816 A * | 4/1950 | Bennek | A01K 97/05 43/4 |
| 2,531,551 A * | 11/1950 | Brecht | A01K 97/05 43/4 |
| 3,308,570 A * | 3/1967 | Horton | A01K 97/04 43/55 |
| 3,509,657 A * | 5/1970 | Bross, Jr. | A01K 97/05 43/57 |
| 3,541,722 A * | 11/1970 | Garrison | A01K 97/00 43/66 |
| 3,550,307 A * | 12/1970 | Donner | A01K 97/05 43/56 |
| 3,738,050 A | 6/1973 | Naill | |
| 3,949,510 A * | 4/1976 | Johnson | A01K 77/00 43/4 |
| 4,118,807 A * | 10/1978 | McCauley | A01K 97/18 43/4 |
| 4,815,230 A * | 3/1989 | Allen | A01K 97/04 43/55 |
| 5,067,270 A | 11/1991 | Garrick | |

(Continued)

*Primary Examiner* — Richard G Davis (57) ABSTRACT

A minnow capturing system includes a tubular member that has an open first end, an open second end and a perimeter wall having a plurality of elongated slits. The slits expose portions of a minnow held within the tubular member such that a hook can extend through the slits and through the minnow. A housing for holding minnows and water has a bottom wall and a peripheral wall. The peripheral wall includes a front wall, a rear wall, a first side wall and a second side wall. A juncture is defined where the bottom wall meets the first side wall. The interior surface of the first side wall is concavel arcuate from the front wall to the rear wall. The tubular member is positionable against the juncture such that a minnow in the housing swims into the second end.

17 Claims, 12 Drawing Sheets

(56) References Cited

U.S. PATENT DOCUMENTS

| | | | | |
|---|---|---|---|---|
| 5,109,625 A | * | 5/1992 | Skrede | A01K 97/05 |
| | | | | 220/263 |
| 5,465,522 A | * | 11/1995 | Varda | A01K 97/04 |
| | | | | 43/11 |
| 5,845,431 A | * | 12/1998 | Waite | A01K 77/00 |
| | | | | 43/54.1 |
| 6,327,808 B1 | | 12/2001 | Zascavage | |
| 7,426,801 B2 | | 9/2008 | Freburger, Jr. | |
| 2005/0081423 A1 | * | 4/2005 | Pangrcic | A01K 97/04 |
| | | | | 43/4 |
| 2006/0260172 A1 | | 11/2006 | Hufe, Jr. | |

\* cited by examiner

MINNOW CAPTURING SYSTEM AND METHOD

CROSS-REFERENCE TO RELATED APPLICATIONS

I hereby claim the benefit under 35 U.S.C., Section 120 of U.S. application Ser. No. 15/920,140 filed on Mar. 13, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to minnow hooking facilitating device and more particularly pertains to a new minnow hooking facilitating device for facilitating the storing, capturing and hooking of a minnow.

(2) Description of Related Art Including Information Disclosed Under 37 CFR 1.97 and 1.98

The prior art relates to minnow storage devices as well as those devices which have been used for retaining a minnow in place such that a hook can more easily be extended through the minnow.

BRIEF SUMMARY OF THE INVENTION

An embodiment of the disclosure meets the needs presented above by generally comprising a tubular member that has a first end, a second end and a perimeter wall extending between the first and second ends. Each of the first and second ends is open. The tubular member has a first portion including the first end and a second portion including the second end. The perimeter wall of the first portion has a plurality of elongated slits therein extending into the first end and toward the second portion. The slits expose portions of a minnow held within the tubular member such that a hook can extend through the slits and through the minnow. A housing has a bottom wall and a peripheral wall attached to and extend upwardly from the bottom wall. The housing holds water and a plurality of minnows. The peripheral wall includes a front wall, a rear wall, a first side wall and a second side wall. The peripheral wall has a top edge defining an opening extending into the housing. The bottom wall has a top side that is planar and a juncture of the top side and an interior surface of the first side wall is continuously concavely arcuate. The interior surface of the first side wall is concavely arcuate from the front wall to the rear wall. The interior of the first side wall is linear from the juncture to the top edge of the peripheral wall. The tubular member is positionable against the juncture at the first side wall such that a minnow in the housing swims into the second end.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 15 thereof, a new minnow hooking facilitating device embodying the principles and concepts of an embodiment of the disclosure and generally designated by the reference numeral 10 will be described.

Figure 14:
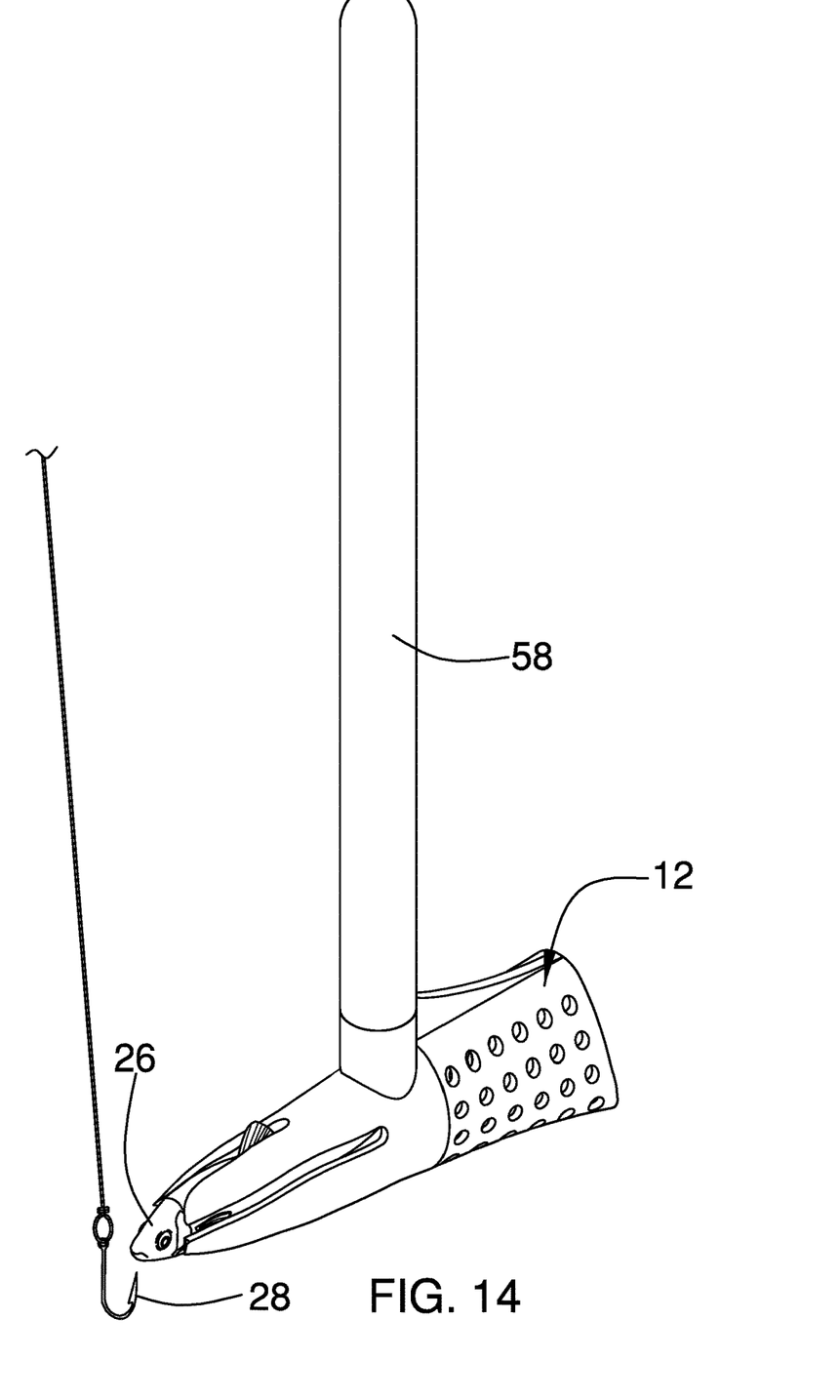
FIG. 14 is a front isometric in-use view of the tubular member of an embodiment of the disclosure.
Figure 15:
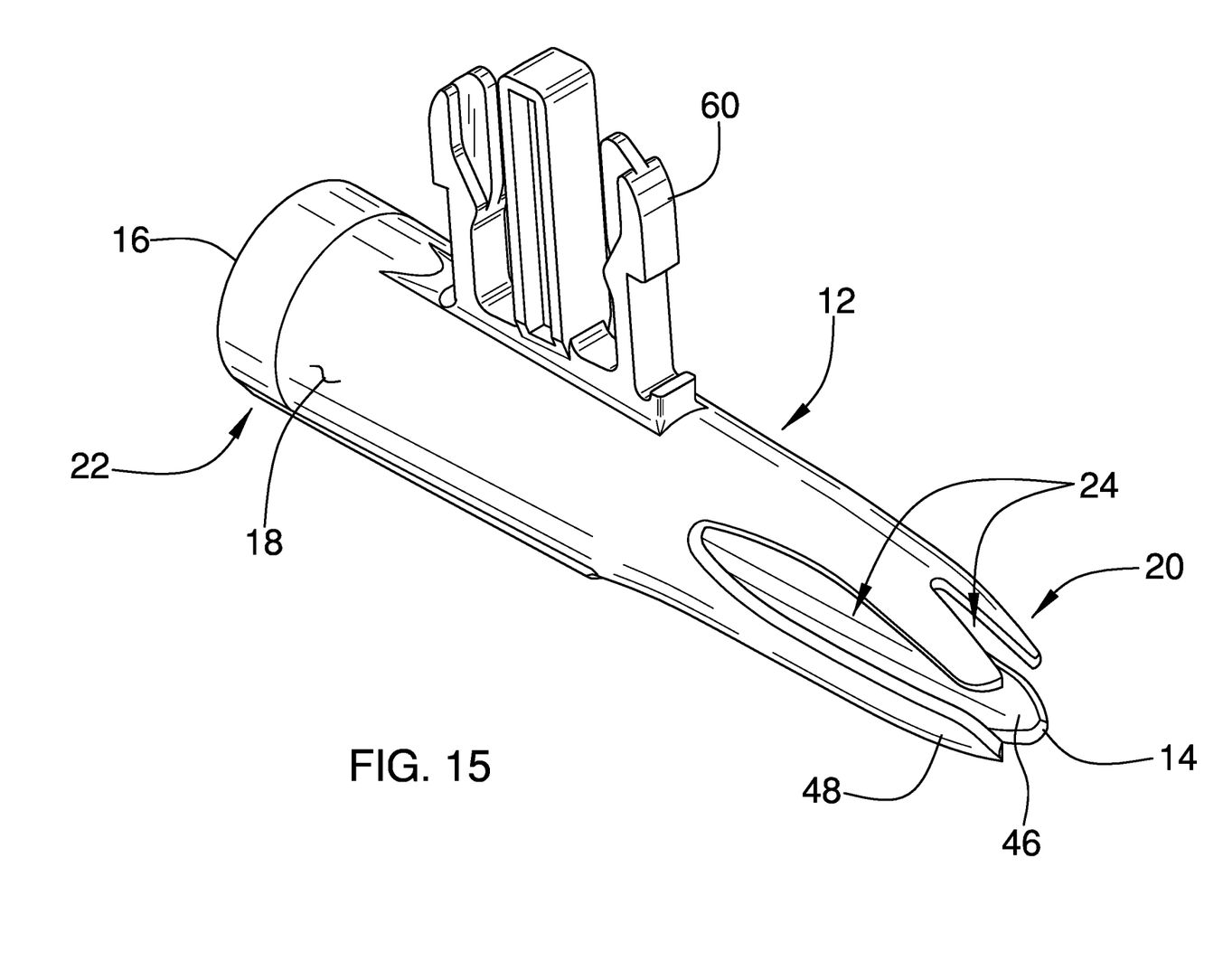
FIG. 15 is a top isometric view of the tubular member of an embodiment of the disclosure.

As best illustrated in FIGS. 1 through 15, the minnow capturing system and method 10 generally comprises a tubular member 12, which is generally shown in FIGS. 6-15 wherein FIG. 14 shows another embodiment of the tubular member 12 than is shown in the other images. The tubular member 12 has a first end 14, a second end 16 and a perimeter wall 18 extending between the first 14 and second 16 ends. Each of the first 14 and second 16 ends is open. The tubular member 12 includes a first portion 20 including the first end 14 and a second portion 22 including the second end 16. The perimeter wall 18 of the first portion 20 has a plurality of elongated slits 24 therein extending into the first end 14 and toward the second portion 22. The slits 24 are configured to expose portions of a minnow 26 held within the tubular member 12 such that a hook 28 can be extended through the slits 24 and through the minnow 26.

Figure 1:
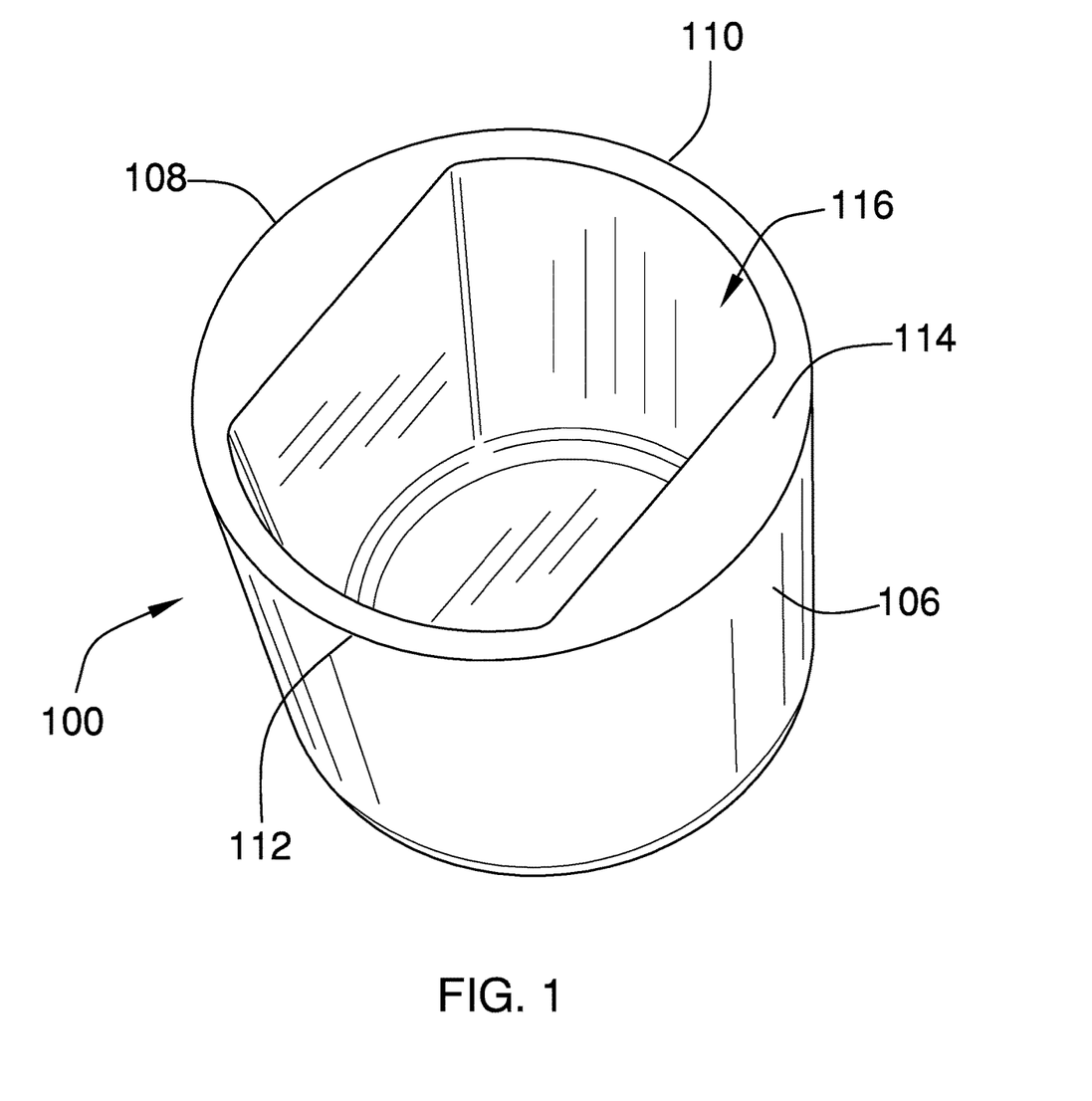
FIG. 1 is an isometric top view of a housing of a minnow capturing system and method according to an embodiment of the disclosure.
Figure 2:
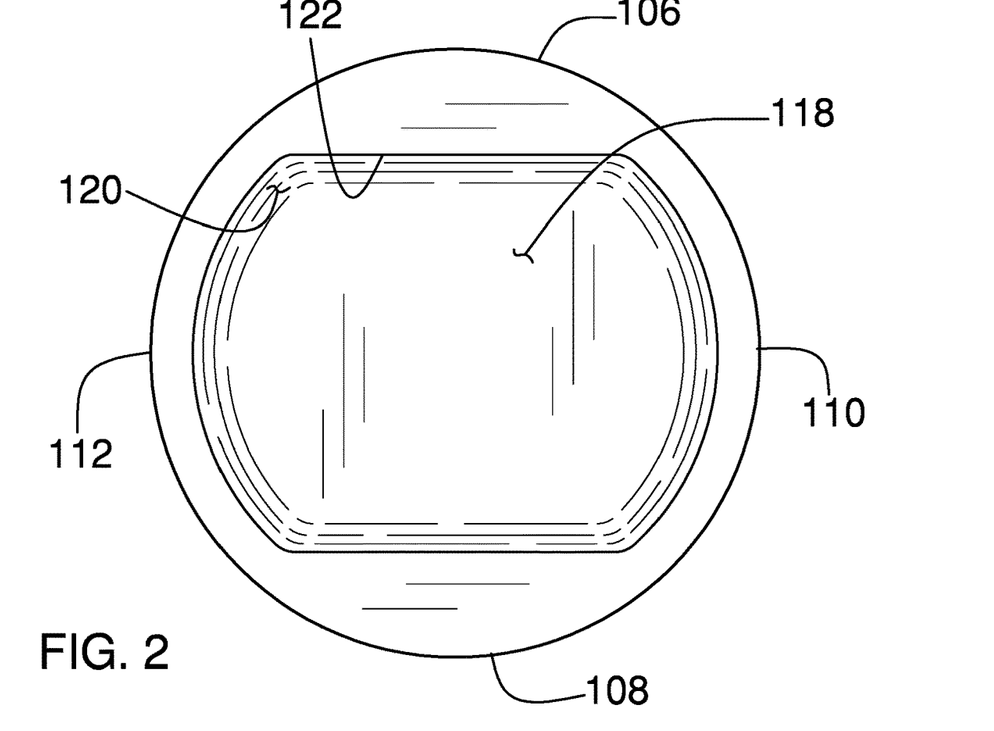
FIG. 2 is a top view of the housing of an embodiment of the disclosure.
Figure 3:
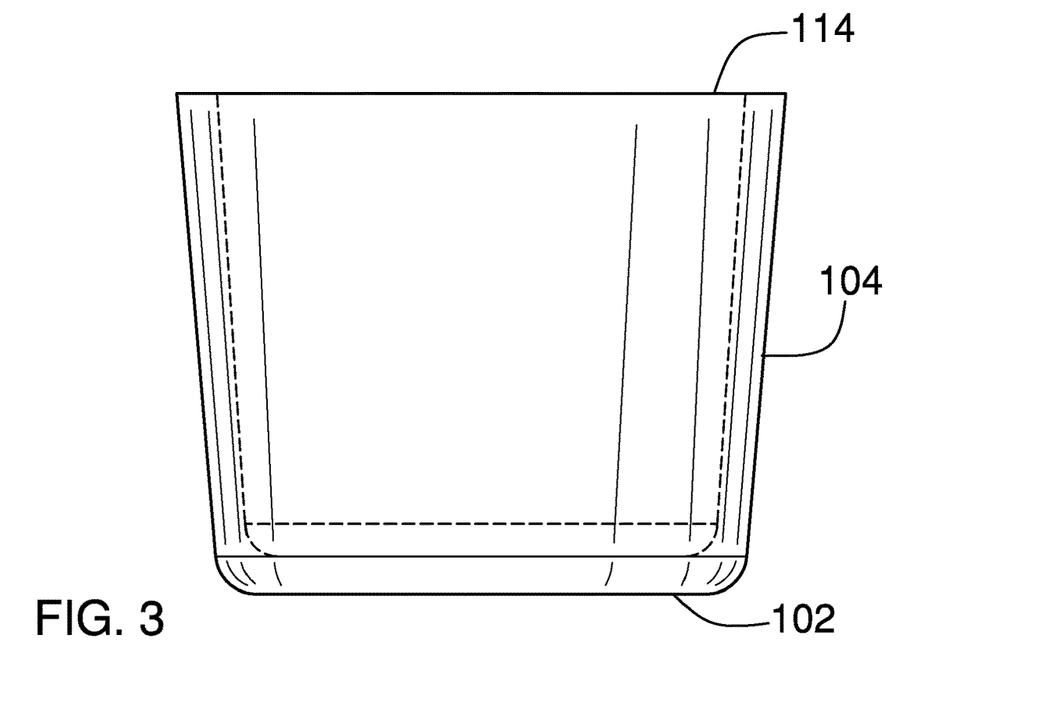
FIG. 3 is a side view of the housing of an embodiment of the disclosure.
Figure 4:
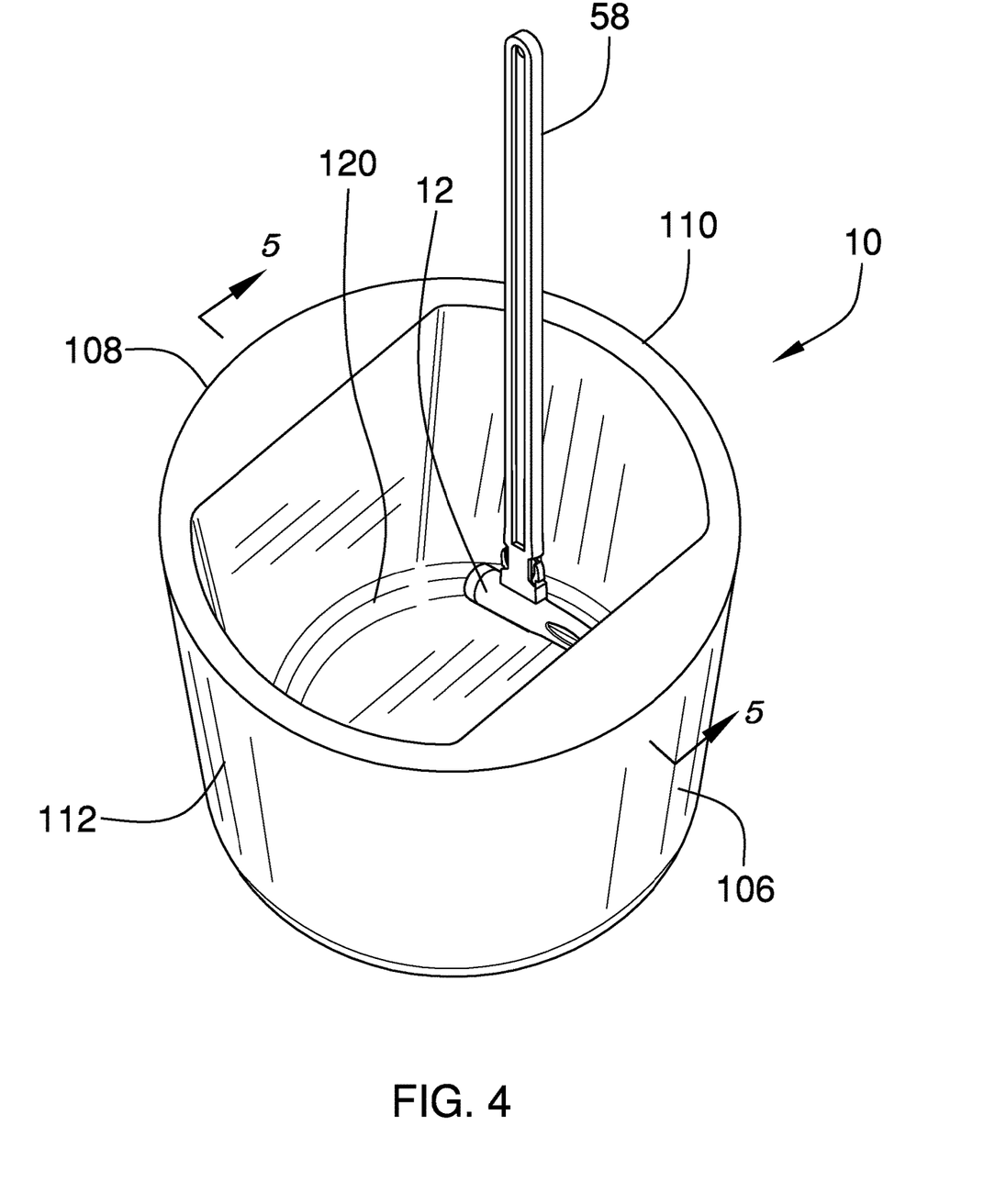
FIG. 4 is a top isometric view of an embodiment of the disclosure.
Figure 5:
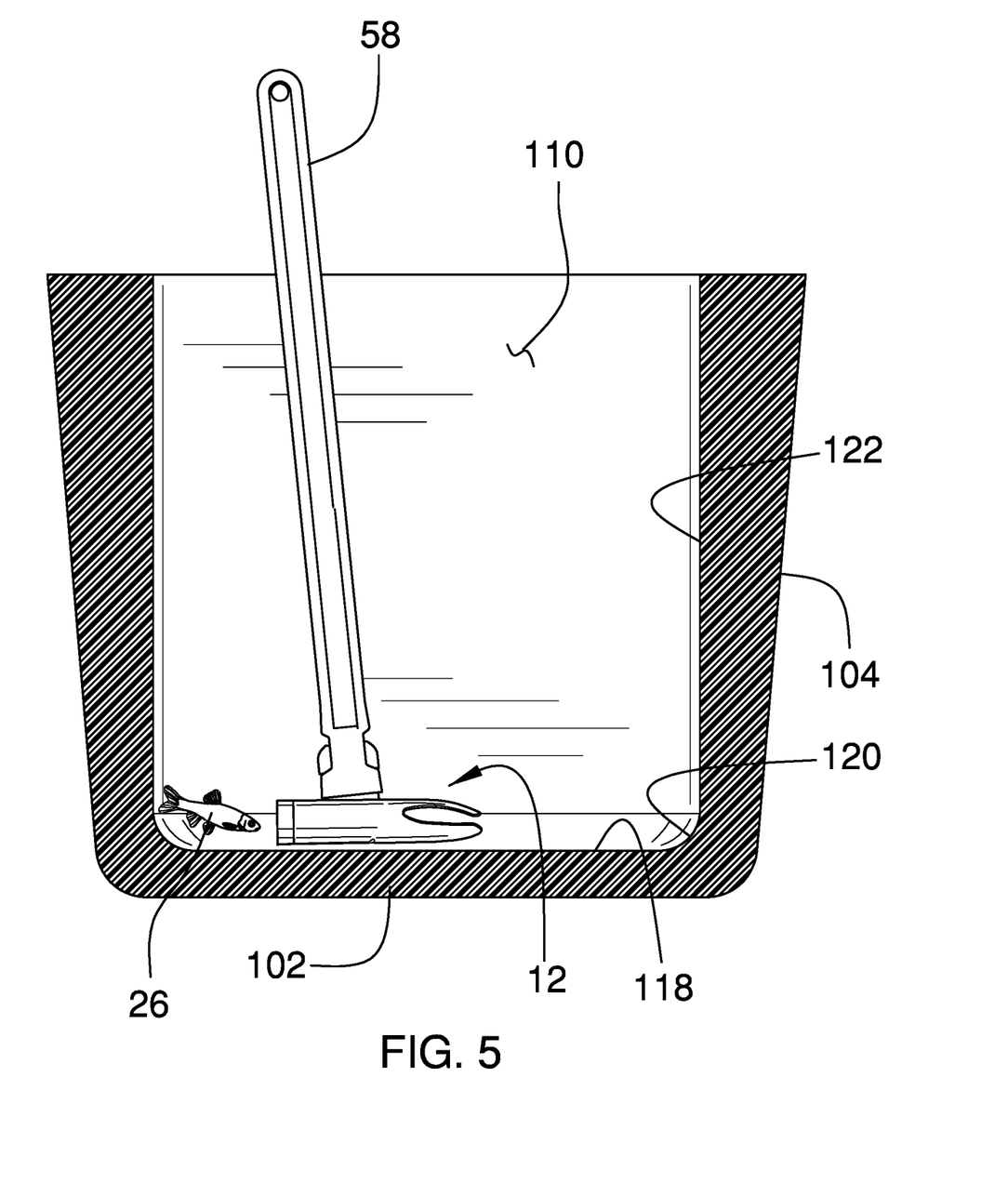
FIG. 5 is a cross-sectional view of an embodiment of the disclosure taken along line 5-5 of FIG. 4.
Figure 6:
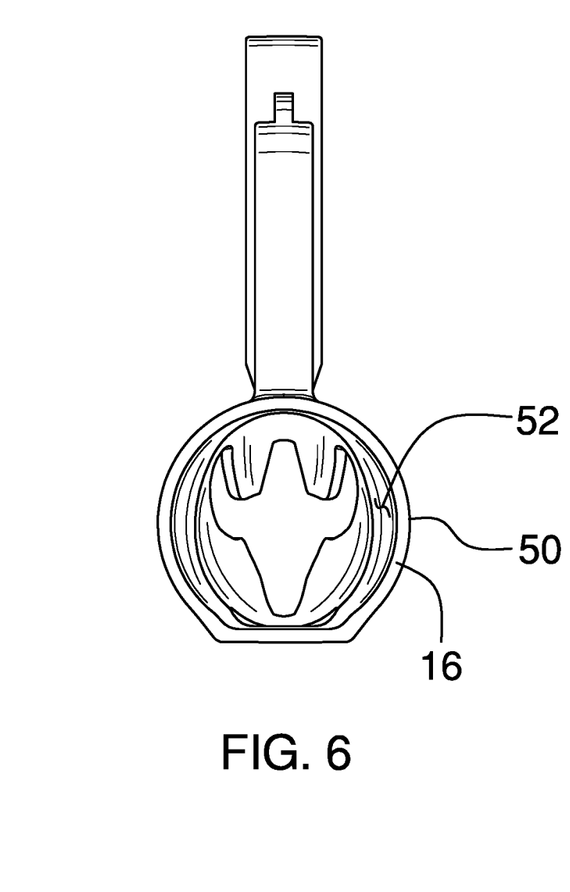
FIG. 6 is a rear view of a tubular member an embodiment of the disclosure.
Figure 7:
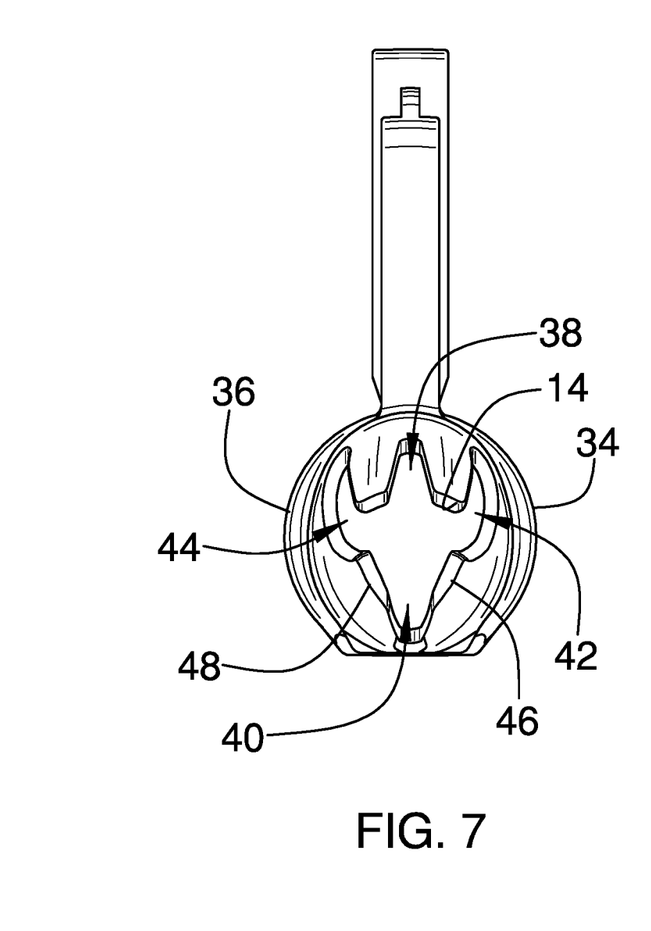
FIG. 7 is a front view of the tubular member of an embodiment of the disclosure.
Figure 8:
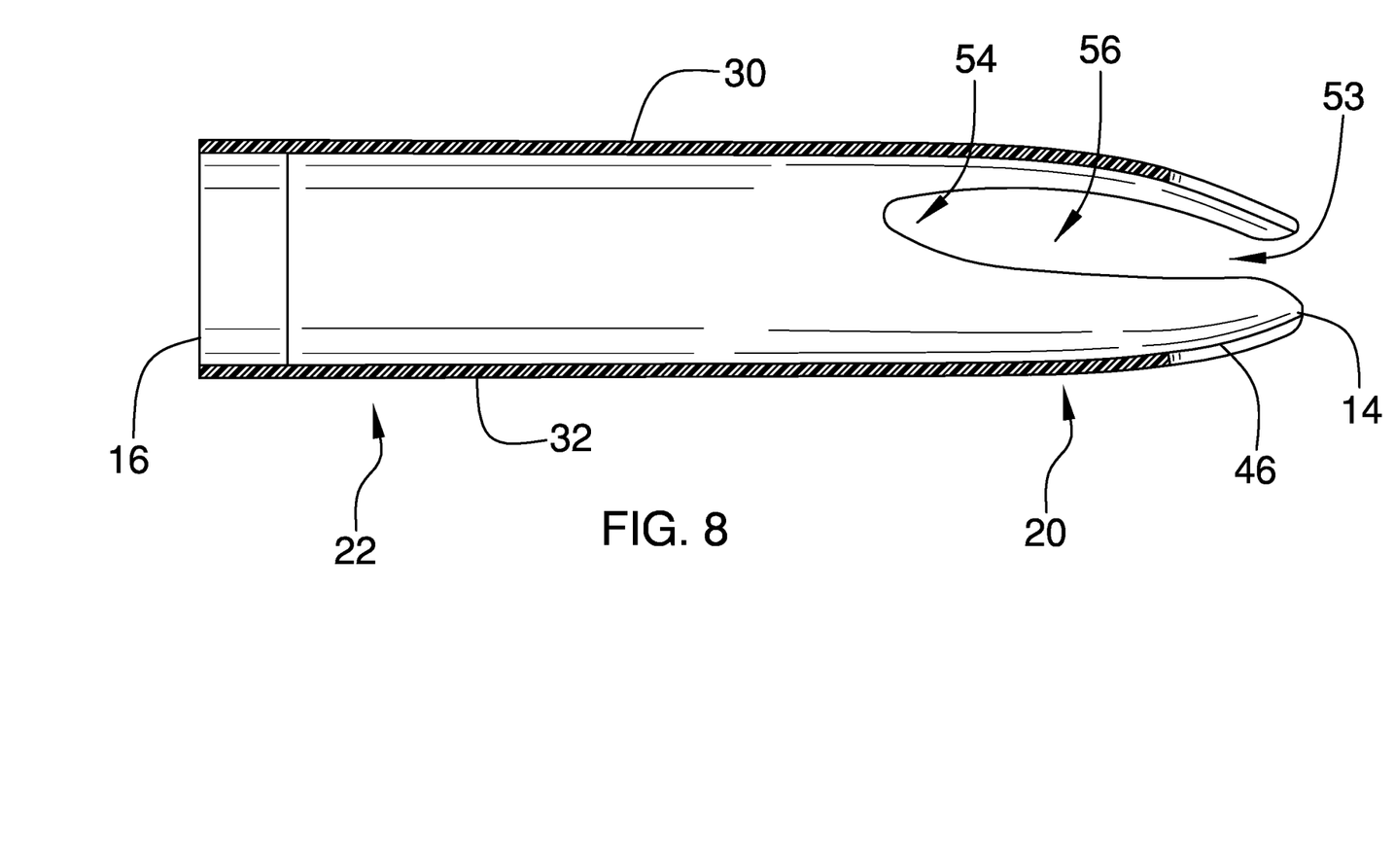
FIG. 8 is a cross-sectional view of the tubular member of an embodiment of the disclosure.
Figure 9:
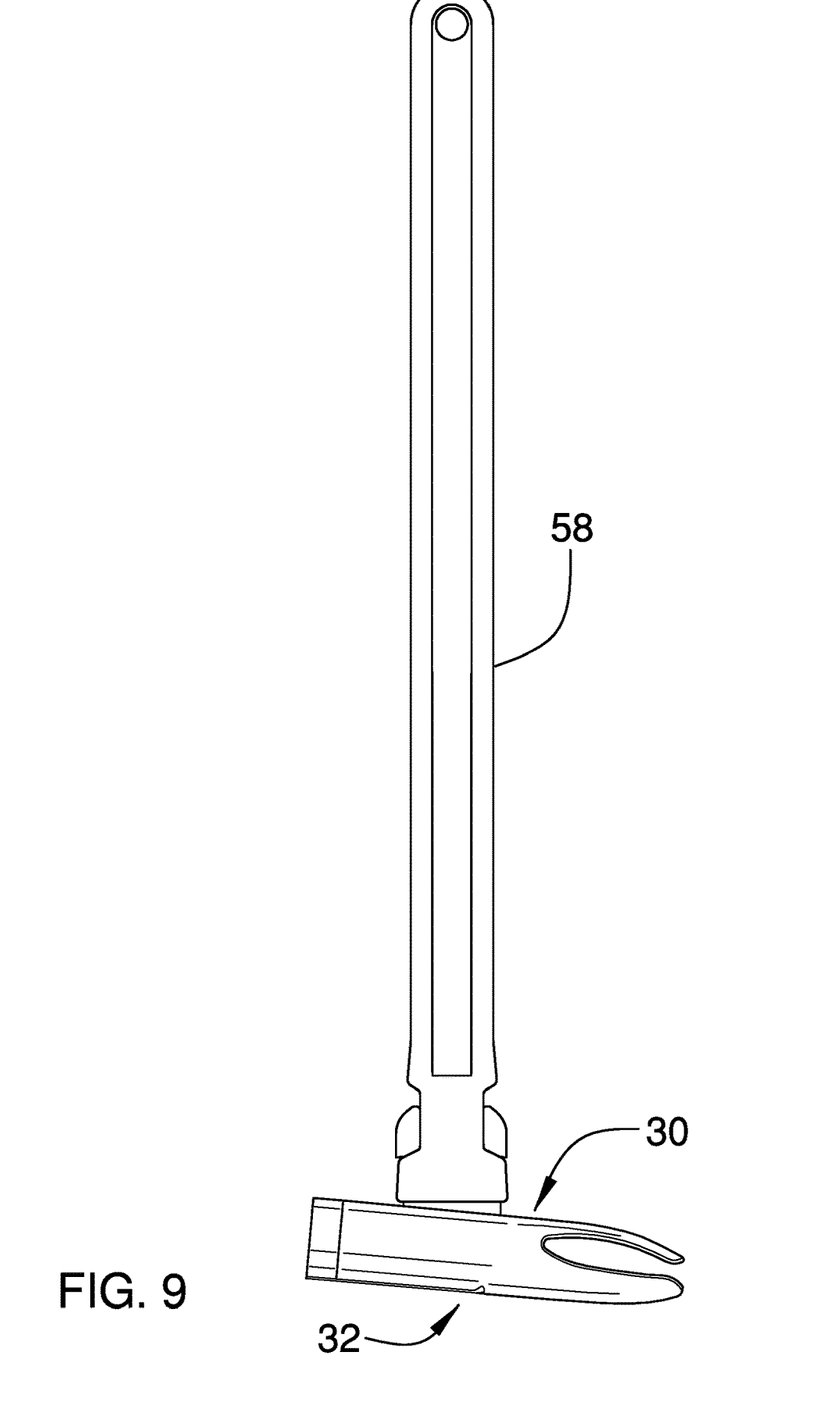
FIG. 9 is a side view of an embodiment of the disclosure.
Figure 10:
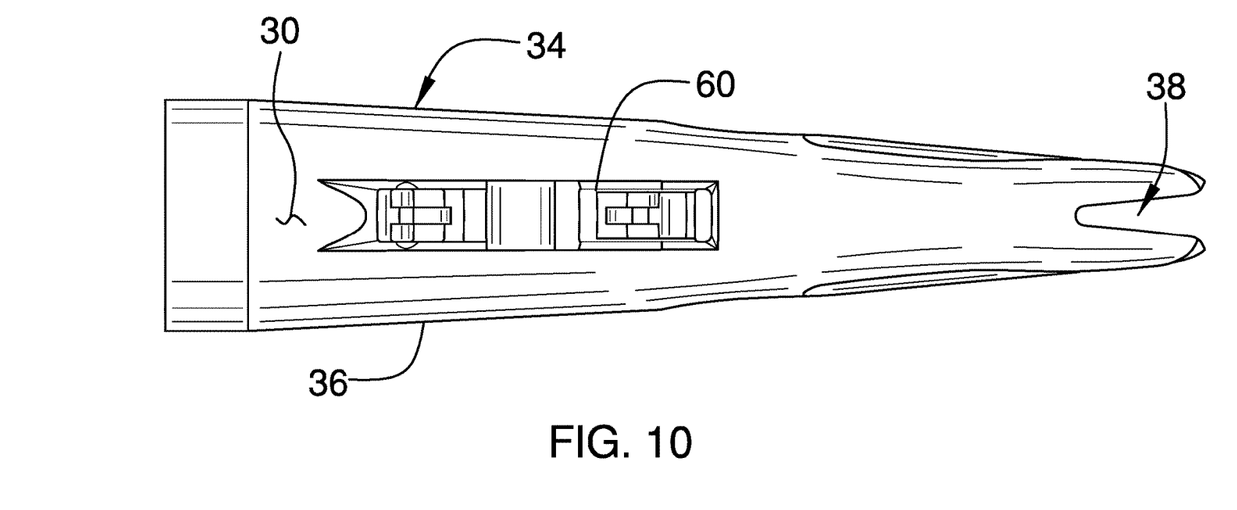
FIG. 10 is a top view of the tubular member of an embodiment of the disclosure.
Figure 11:
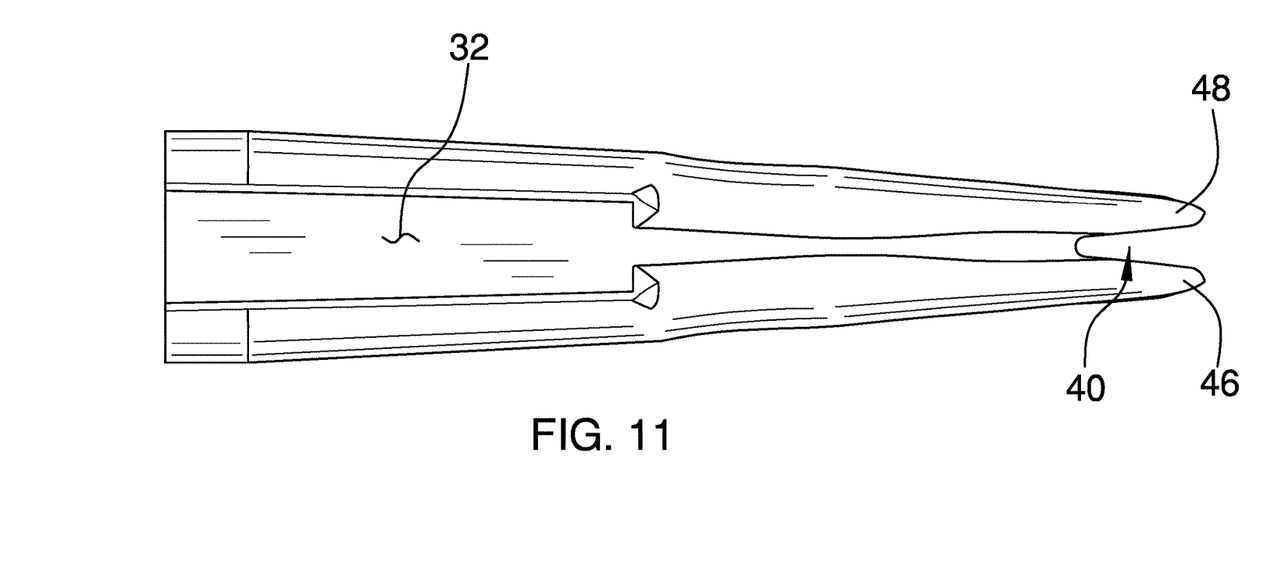
FIG. 11 is a bottom view of the tubular member of an embodiment of the disclosure.
Figure 12:
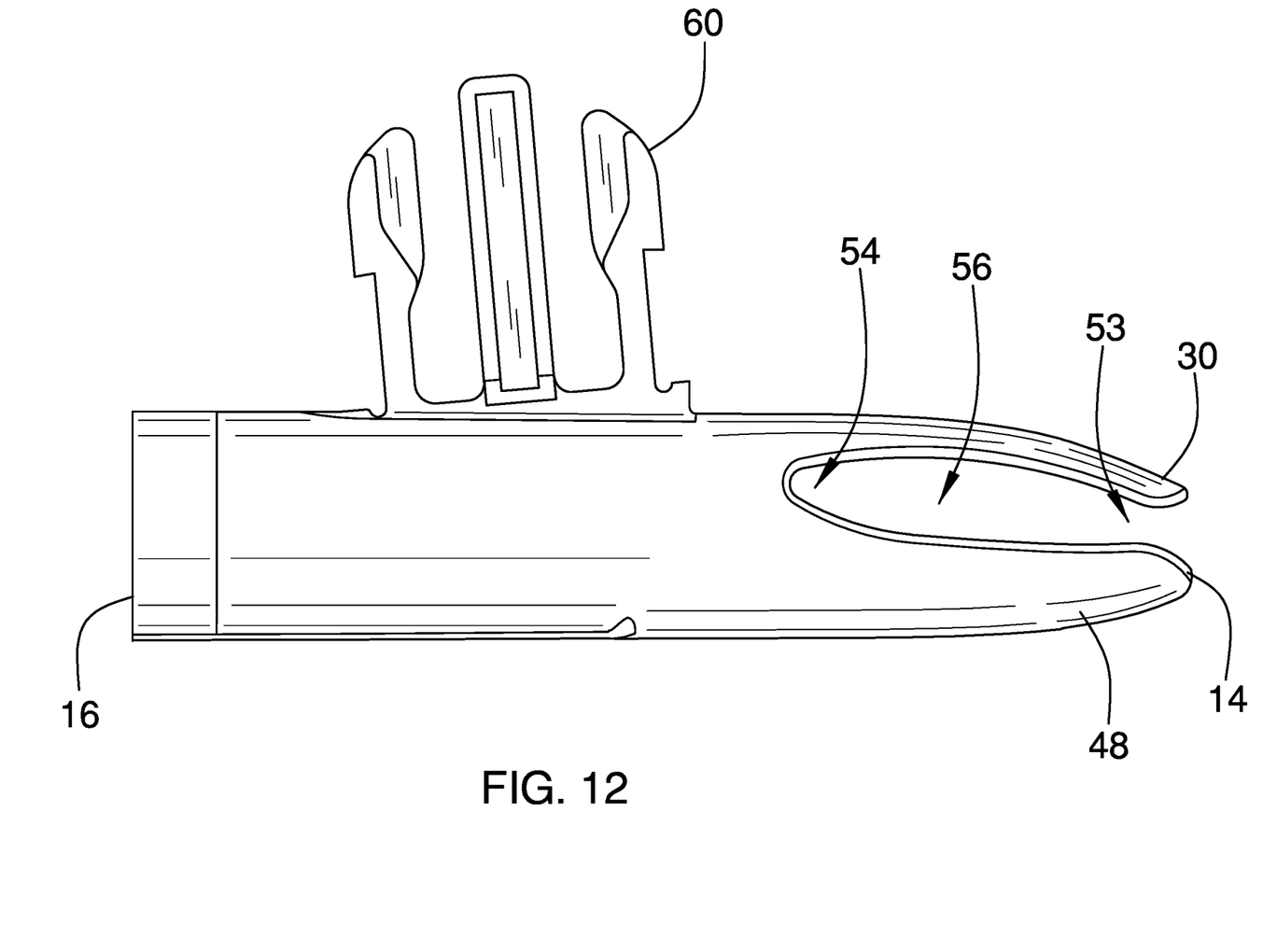
FIG. 12 is a side view of an embodiment of the disclosure.
Figure 13:
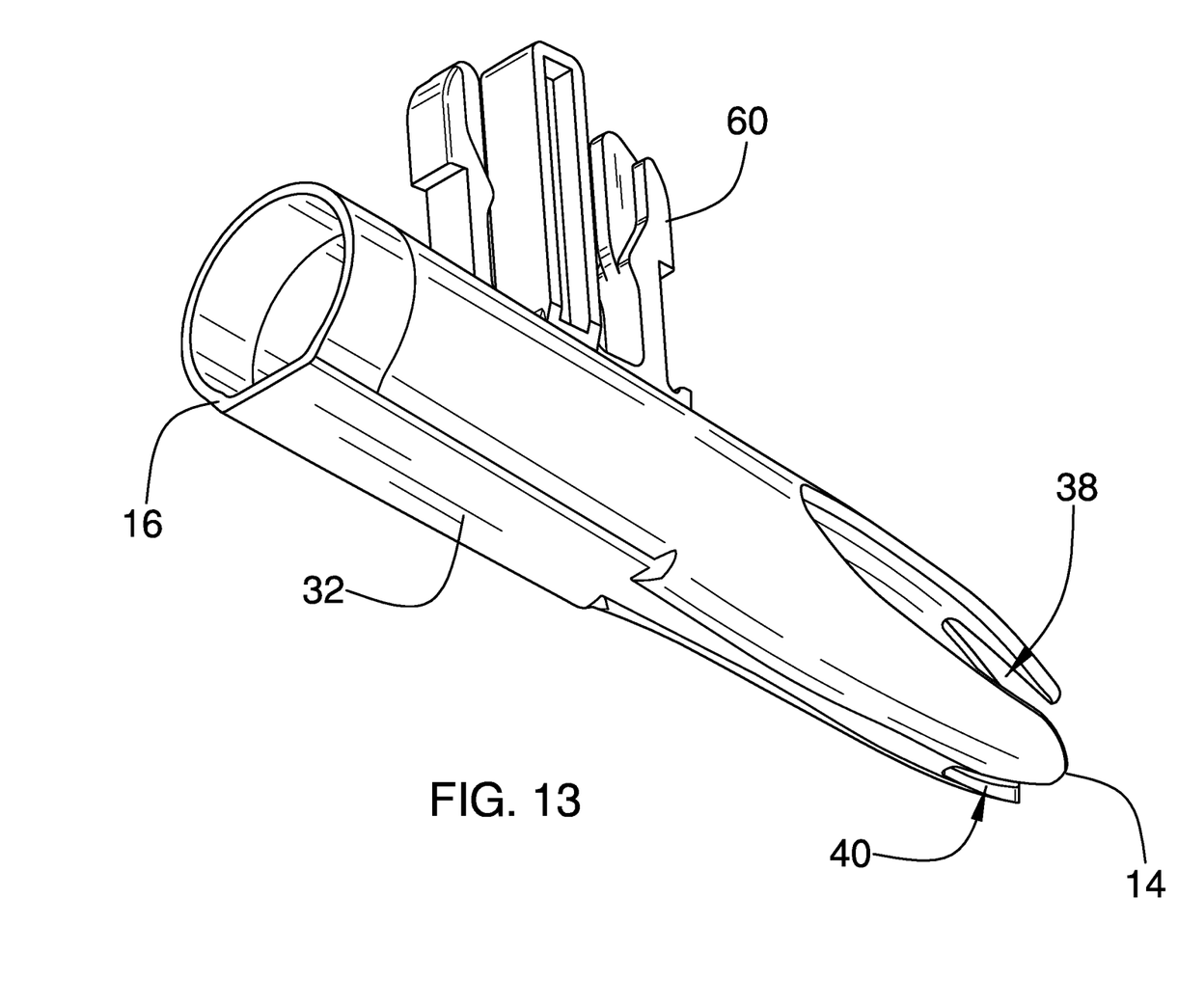
FIG. 13 is a bottom isometric view of the tubular member of an embodiment of the disclosure.

As shown in FIGS. 9-11, the perimeter wall 18 includes an upper wall 30, a lower wall 32, a first lateral wall 34 and a second lateral wall 36. As shown best in FIG. 7, the slits 24 include an upper slit 38 positioned in the upper wall 30, a lower slit 40 positioned in the lower wall 32, a first lateral slit 42 positioned in the first lateral wall 34 and a second lateral slit 44 positioned in the second lateral wall 36. A first lower section 46 of the perimeter wall 18 is defined between the lower slit 40 and the first lateral slit 42, and a second lower section 48 of the perimeter wall 18 is defined between the lower slit 40 and the second lateral slit 44. The lower walls 32 of the first 46 and second 48 lower sections are each curved upwardly adjacent to the first end 14 as can be seen in FIGS. 8 and 12. Furthermore, sections of the upper wall 30 on either side of the upper slit 38 are curved downwardly. The lower wall 32 of the second portion 22 is planar, while the upper 30, first lateral 34 and second 36 lateral walls each has an outer convexly arcuate surface 50 and an interior concavely arcuate surface 52. These shapes assist in retaining a minnow 26 in place such that it cannot easily move once its head is positioned between the slits 24.

As shown in FIGS. 8 and 12, the first 42 and second 44 lateral slits each include an outer portion 53 adjacent to the first end 14, an inner portion 54 positioned adjacent to the second portion 22, and a middle portion 56 positioned between the outer 53 and inner 54 portions. The middle portion 56 has a greater height than the inner 54 and outer 53 portions. This greater height in the middle portions 56 ensures that the minnow 26 is still held in place while providing a larger entry point for a hook 28. Also, the slits 24 are positioned nearer to the upper wall 30 than the lower wall 32. This again is an optimal location for the first 42 and second 44 lateral slits as it allows the hook 28 to be extended through the minnow 26 adjacent to its spine and away from its internal organs.

A handle 58 is attached to the tubular member 12. The handle 58 extends upwardly from the upper wall 30 and the handle 58 is positioned between the first 14 and second 16 ends. The handle 58 may be removably coupled to the tubular member 12 by a coupler 60 that is attached to the tubular member 12 and which is receivable by the handle 58. This allows a user to use different length handles 58 with the same tubular member 12 or utilize tubular members 12 of differing sizes with the same handle 58.

A housing 100 has a bottom wall 102 and a peripheral wall 104 that is attached to and extends upwardly from the bottom wall 102. The bottom 102 and peripheral 104 walls of the housing 100 will typically be comprised of an insulating material. While any insulating material may be used which is used in the minnow storing arts, one such material often used are closed-cell foam materials such as expanded polystyrene. However, the housing 100 may also include plastic walls which include thermally insulated core materials. The housing 100 is configured to hold water and a plurality of minnows 26. The peripheral wall 104 includes a front wall 106, a rear wall 108, a first side wall 110 and a second side wall 112. The peripheral wall 104 has a top edge 114 defining an opening 116 extending into the housing 100. The bottom wall 102 has a top side 118 that is planar, but a juncture 120 of the top side 118 and an interior surface 122 of the peripheral wall 104 may be continuously concavely arcuate for reasons stated below.

The interior surface 122 of the first side wall 110 is concavely arcuate from the front wall 106 to the rear wall 108, though the interior surface 122 of the first side wall 110 is linear from the juncture 120 to the top edge 114 of the peripheral wall 104. That is the first side wall 110 is straight in the vertical direction but concavely arcuate in the lateral direction. The interior surface 122 of the second side wall 112 may be concavely arcuate from the front wall 106 to the rear wall 108 and linear from the juncture 120 to the top edge 114 of the peripheral wall 104 to firm a mirror image of the first side wall 110.

The interior surfaces 122 of the front 106 and rear 108 walls are each planar from the juncture 120 to the top edge 114. The tubular member 12 is positionable against the juncture 120 at the first side wall 110 such that a minnow 26 in the housing 100 swims into the second end 16. It has been found that a minnow 26, while being captured, tends to swim toward a bottom corner of a typical minnow bucket. By making the juncture 120 continuously arcuate, the minnow 26 will continually swim along the juncture 120 while searching for a corner. The tubular member 12 has a flat bottom side, or lower wall 30, to sit upon the top side 118 of the planar bottom wall 102, but the tubular member 12 also has an outer convexly arcuate surface 50 which ensures a tighter fit against the juncture 120. When the tubular member 12 is placed in abutment of the juncture 120 at the first side wall 110, the minnow will 26 not be able to swim between the tubular member 12 and the juncture 120 and will therefore freely swim into the tubular member 12 where it is captured for hooking. It should be understood that juncture 120 need not be concavely arcuate as the minnow will continue to swim along the juncture 120 due to the arcuate shapes of the first 110 and second 112 side walls as well. However, the shape of the juncture 120 does assist in the juncture 120 conforming to the shape of the tubular member 12.

The housing 100 has a minimal inner width measured from the front wall 106 to the rear wall 108 along the top side 118 of the bottom wall 104, and which extends from the abutment of the first side wall 110 with the front wall 106 to the abutment of the first side wall 110 with the rear wall 108. The minimal inner width is greater than a length of the tubular member 12 from the first end 14 to the second end 16. That is, the tubular member 12 will always fit along the first side wall 110 without abutting simultaneously the front 106 and rear walls 108. The minimal inner width is greater than at least 4.0 inches and more typically greater than 5.0 inches, while the length of the tubular member is less than 4.0 inches.

In use, the housing 100 is used in a conventional manner to hold minnows 26 such that they may be accessed as needed by a person who is fishing. However, the unique shape of the housing 12 helps a person to capture minnows 26, particularly when using the tubular member 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A minnow holding and capturing system configured to retain a minnow such that the minnow is easily captured for being hooked with a fishing hook, the system comprising:
   a tubular member having a first end, a second end and a perimeter wall extending between the first and second ends, each of the first and second ends being open, the tubular member including a first portion including the first end and a second portion including the second end, the perimeter wall of the first portion having a plurality of elongated slits therein extending into the first end and toward the second portion, wherein the slits are configured to expose portions of a minnow held within the tubular member such that a hook can extend through the slits and through the minnow;
   a housing having a bottom wall and a peripheral wall being attached to and extending upwardly from the bottom wall, the housing being configured to hold water and a plurality of minnows, the peripheral wall including a front wall, a rear wall, a first side wall and a second side wall, the peripheral wall having a top edge defining an opening extending into the housing;
   the bottom wall having a top side being planar, a juncture of the top side and an interior surface of the first side wall being continuously concavely arcuate; and
   the interior surface of the first side wall being concavely arcuate from the front wall to the rear wall, the interior of the first side wall being linear from the juncture to the top edge of the peripheral wall, wherein the tubular member is positionable against the juncture at the first side wall such that a minnow in the housing swims into the second end.

2. The minnow holding and capturing system according to claim 1, wherein the perimeter wall includes an upper wall, a lower wall, a first lateral wall and a second lateral wall, the slits including an upper slit positioned in the upper wall, a lower slit positioned in the lower wall, a first lateral slit positioned in the first lateral wall, and a second lateral slit positioned in the second lateral wall.

3. The minnow holding and capturing system according to claim 2, wherein a first lower section of the perimeter wall is defined between the lower slit and the first lateral slit, a second lower section of the perimeter wall being defined between the lower slit and the second lateral slit, the lower wall of the first and second lower sections each being curved upwardly adjacent to the first end.

4. The minnow holding and capturing system according to claim 2, wherein the lower wall of the second portion is planar, the first lateral and second lateral walls each having an outer convexly arcuate surface.

5. The minnow holding and capturing system according to claim 2, wherein the first and second lateral slits each include an outer portion adjacent to the first end, an inner portion positioned adjacent to the second portion, and a middle portion positioned between the outer and inner portions, the middle portion having a greater height than the inner and outer portions.

6. The minnow holding and capturing system according to claim 1, further including a handle being attached to the tubular member, the handle extending upwardly from the upper wall.

7. The minnow holding and capturing system according to claim 6, wherein the handle is positioned between the first and second ends, the handle being removably coupled to the tubular member.

8. The minnow holding and capturing system according to claim 1, wherein the interior surfaces of the front and rear walls are each planar from the juncture to the top edge.

9. The minnow holding and capturing system according to claim 8, wherein the juncture is continuously concavely arcuate.

10. The minnow holding and capturing system according to claim 1, wherein the juncture is continuously concavely arcuate.

11. The minnow holding and capturing system according to claim 1, wherein the interior surface of the second side wall is concavely arcuate from the front wall to the rear wall, the interior of the second side wall being linear from the juncture to the top edge of the peripheral wall.

12. The minnow holding and capturing system according to claim 1, wherein the housing has a minimal inner width measured from the front wall to the rear wall along the top side of the bottom wall, the minimal inner width being greater than a length of the tubular member from the first end to the second end.

13. The minnow holding and capturing system according to claim 12, wherein the minimal inner width is greater than 5.0 inches, the length of the tubular member being less than 4.0 inches.

14. The minnow holding and capturing system according to claim 1, wherein the bottom and peripheral walls is comprised of an insulating material.

15. A minnow holding and capturing system configured to retain a minnow such that the minnow is easily captured for being hooked with a fishing hook, the system comprising:
   a tubular member having a first end, a second end and a perimeter wall extending between the first and second ends, each of the first and second ends being open, the tubular member including a first portion including the first end and a second portion including the second end, the perimeter wall of the first portion having a plurality of elongated slits therein extending into the first end and toward the second portion, wherein the slits are configured to expose portions of a minnow held within the tubular member such that a hook can extend through the slits and through the minnow, the perimeter wall including an upper wall, a lower wall, a first lateral wall and a second lateral wall, the slits including an upper slit positioned in the upper wall, a lower slit positioned in the lower wall, a first lateral slit positioned in the first lateral wall, and a second lateral slit positioned in the second lateral wall, a first lower section of the perimeter wall being defined between the lower slit and the first lateral slit, a second lower section of the perimeter wall being defined between the lower slit and the second lateral slit, the lower wall of the first and second lower sections each being curved upwardly adjacent to the first end;

the lower wall of the second portion being planar, the upper, first lateral and second lateral walls each having an outer convexly arcuate surface;

the first and second lateral slits each including an outer portion adjacent to the first end, an inner portion positioned adjacent to the second portion, and a middle portion positioned between the outer and inner portions, the middle portion having a greater height than the inner and outer portions;

a handle being attached to the tubular member, the handle extending upwardly from the upper wall, the handle being positioned between the first and second ends, the handle being removably coupled to the tubular member;

a housing having a bottom wall and a peripheral wall being attached to and extending upwardly from the bottom wall, the housing being configured to hold water and a plurality of minnows, the peripheral wall including a front wall, a rear wall, a first side wall and a second side wall, the peripheral wall having a top edge defining an opening extending into the housing;

the bottom wall having a top side being planar, a juncture of the top side and an interior surface of the peripheral wall being continuously concavely arcuate;

the interior surface of the first side wall being concavely arcuate from the front wall to the rear wall, the interior of the first side wall being linear from the juncture to the top edge of the peripheral wall;

the interior surfaces of the front and rear walls each being planar from the juncture to the top edge, wherein the tubular member is positionable against the juncture at the first side wall such that a minnow in the housing swims into the second end;

the interior surface of the second side wall being concavely arcuate from the front wall to the rear wall, the interior of the second side wall being linear from the juncture to the top edge of the peripheral wall;

the housing having a minimal inner width measured from the front wall to the rear wall along the top side of the bottom wall, the minimal inner width being greater than a length of the tubular member from the first end to the second end, the minimal inner width being greater than 5.0 inches, the length of the tubular member being less than 4.0 inches; and the bottom and peripheral walls being comprised of an insulating material, the insulating material being a closed-cell foam material.

16. A method of capturing a minnow to be hooked, the method comprising the steps of:

positioning a tubular member in a housing containing a minnow, the tubular member having a first end, a second end and a perimeter wall extending between the first and second ends, each of the first and second ends being open, the tubular member including a first portion including the first end and a second portion including the second end, the perimeter wall of the first portion having a plurality of elongated slits therein extending into the first end and toward the second portion, wherein the slits are configured to expose portions of a minnow held within the tubular member such that a hook can extend through the slits and through the minnow, the housing having a bottom wall and a peripheral wall being attached to and extending upwardly from the bottom wall, the housing being configured to hold water and a plurality of minnows, the peripheral wall including a front wall, a rear wall, a first side wall and a second side wall, the peripheral wall having a top edge defining an opening extending into the housing, the bottom wall having a top side being planar, a juncture being defined at the top side and an interior surface of the first side wall, the interior surface of the first side wall being concavely arcuate from the front wall to the rear wall, the interior of the first side wall being linear from the juncture to the top edge of the peripheral wall; and moving the tubular member adjacent to and in abutment with the juncture at the first side wall until the minnow in the housing swims along the juncture and into the second end.

17. The method of capturing a minnow to be hooked according to claim 16, wherein the step of positioning the tubular member in the housing includes the juncture being continuously concavely arcuate.

* * * * *